United States Patent
Burton et al.

[15] 3,657,073
[45] Apr. 18, 1972

[54] APPARATUS FOR DETECTING VIABLE ORGANISMS

[72] Inventors: George M. Burton, Burton; Gerald M. Christensen; Arthur J. Pilgrim, both of Bellevue, all of Wash.

[73] Assignee: The Boeing Company, Seattle, Wash.

[22] Filed: May 12, 1966

[21] Appl. No.: 549,717

[52] U.S. Cl.............................195/127, 195/103.5, 195/100
[51] Int. Cl. .................................................................C12b
[58] Field of Search......................................195/103.5, 127

[56] References Cited

UNITED STATES PATENTS

| 2,854,384 | 9/1958 | Beakley et al. | 195/103.5 |
| 3,239,429 | 3/1966 | Menolasino et al | 195/103.5 |
| 3,346,464 | 10/1967 | Ernst | 195/103.5 |

OTHER PUBLICATIONS

Journal American Water Works Association by Levin et al., Vol. 49 No. 8 pages 1069 to 1076 (August 1957)

Primary Examiner—Alvin E. Tanenholtz
Attorney—Glenn Orlob and Sam E. Laub

[57] ABSTRACT

A three chamber sterilization efficiency detector having a first chamber containing viable organisms that are subjected to the sterilization process; a second chamber separated from the first by an openable partition containing nutrient media; and a third chamber separated from the second by a semi-permeable partition containing means for detecting the products of the life processes of the organisms. After sterilization, the openable partition is opened to allow the nutrient media to contact the organisms and support the life processes of any surviving organisms and the products of such life processes pass through the semi-permeable partition to be detected in the third chamber.

9 Claims, 6 Drawing Figures

APPARATUS FOR DETECTING VIABLE ORGANISMS

This invention relates to a method and supporting apparatus for determining the effectiveness of a sterilization process. In greater detail, this invention is a method and apparatus capable of determining sterilization of a region after the completion of the sterilization process without having access to or violating the sterilization of the region.

The importance of checking industrial processes attempting to achieve a sterilization cannot be overemphasized. Sterilization processes are very important in such industries as food processing, chemical processing and drug processing. A failure to achieve the required sterilization and level of sanitation in any of these processed products can result in serious consequences ranging from illness to death. Further need for checking sterilization processes exists in the space program where the payload of hardware on a space shot should be free of organisms according to recent governmental requirements.

Prior attempts to obtain methods for checking sterilization include standard bacterial plate counting techniques, as set forth in U.S. Pat. No. 2,931,757, temperature color change indicators, as set forth in U.S. Pat. No. 3,114,349, and absorbent material loaded with nutrient substances, as set forth in U.S. Pat. No. 2,904,474. All these prior methods have shortcomings, such as the contamination of the area to be tested with foreign substances, the cost of the test and the length of time needed for the determination as well as inherent unreliability and inefficiency. The instant invention is designed to give a reliable, rapid determination of sterilization in a qualitative sense, thus overcoming the above problems.

The main object of the present invention is a method and supporting apparatus capable of proving sterility or the absence of sterility within a given portion of a total volume when there is no access to the total volume and there is no allowable entrance or violation of the final sterilization of said volume by testing apparatus.

Another object of the instant invention is to achieve an expendable apparatus for checking the efficiency of a sterilization process.

It is a contrasting object of this invention to have a permanent apparatus capable of carrying out very sensitive checks on the efficiency of a sterilization process.

An additional object of the present invention is a qualitative determination of the presence of any viable organisms after a sterilization process.

An additional object accomplished by the present invention is the utilization of a radioactive means in the apparatus of the instant invention for sensing viable organisms after a sterilization process.

It is a further object of the present invention to obtain an apparatus capable of detecting viable organisms with a short time lapse between the initiation and the completion of the determination.

It is still a further object of the present invention to obtain a method and apparatus capable of detecting the efficiency of sterilization processes in the food processing industry, the chemical processing industry, the drug processing industry, etc.

A further object of this invention is a method of checking the efficiency of a sterilization process wherein a defined region of known viable organism content is isolated within a given total volume and is subjected to the identical sterilization process as the total volume and thereafter connected to a unit which determines the efficiency of the sterilization process by detecting the life processes of any surviving organisms.

The foregoing object is further expanded upon by using a multiplicity of defined regions in the given total volume wherein one of the said regions has no viable organism content.

A further object of this invention is a method according to any of the foregoing methods, wherein the efficiency of a sterilization process conducted upon a given surface area is determined instead of the efficiency of a sterilization process for a given volume.

Other objects and applications of this invention will be apparent to those skilled in the art from reading the following description taken in connection with the drawings, in which.

This invention consists of a method of checking the efficiency of a sterilization process comprising (a) subjecting a defined test region having known viable organisms therein to a sterilization process which is carried out over a given total volume, (b) exposing said defined test region to a life-supporting medium and (c) detecting the presence or absence of life processes resulting from the exposure of step (b). As a practice of this invention, said defined test region is extracted from said given total volume after completion of step (a) and before undertaking steps (b) and (c). This extraction is optional, being dependent on the type of material and product undergoing test. It is possible to leave said defined test region permanently in said total volume. The foregoing process can be conducted upon a given total surface area as well as a given total volume.

In greater detail, the instant invention is a method of checking a sterilization comprising the steps of (a) defining a known, sealed region, within said volume or surface area to be sterilized, said region having three separate units therein and readout means therefrom, wherein the first unit contains a known quantity of known viable organisms, the second unit contains a life supporting fluid solution capable of supporting life processes of said organisms and the third unit contains detection means capable of detecting gaseous materials of the life processes of said organisms, (b) subjecting said sealed region to the sterilization process to be carried out over the whole volume, (c) injecting the life supporting fluid of the second unit into said first unit and (d) in the third unit detecting the possible presence of gaseous materials of life processes of said organisms resulting therefrom.

Figure 1:
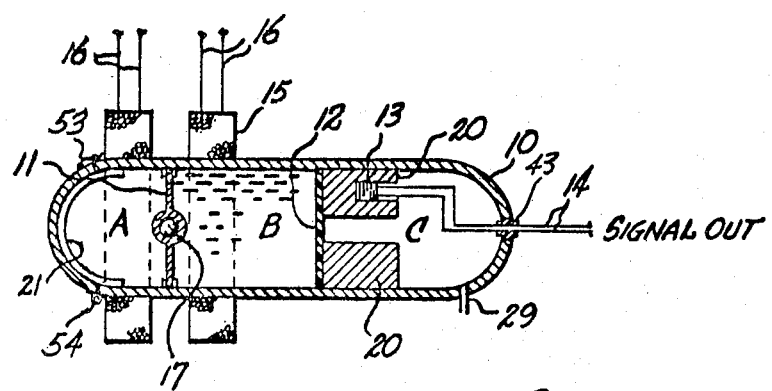
FIGS. 1 and 2 show apparatus capable of detecting viable organisms surviving a sterilization process.
Figure 2:
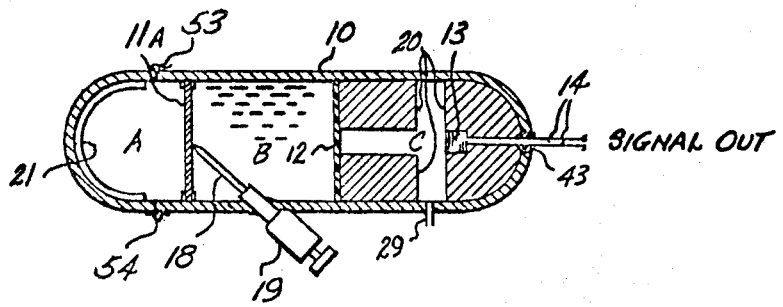

Apparatus capable of carrying out the above method are depicted in FIGS. 1 and 2, wherein container means 10 has therein two partitions 11 (11A) and 12. Container means 10 and temporary partition 11 define Region A in FIG. 1 in which viable organisms on tape 21 are introduced by opening said container means 10 at latch 53 and hinge 54, thereafter closing container means 10 and again sealing off the unit. Container means 10, partition 11 and partition 12 define Region B in FIG. 1 having therein a medium containing a radioactively labeled nutrient in solution form. It is also possible to use a nutrient in solution form without having a radioactive label in the nutrient. Container means 10 and partition 12 define another Region C having therein detection means 13 with wire means 14 exiting container means 10 at 43. The detection means 13 is capable of determining reactions by viable organisms and gives a signal output indicative of these reactions. Region C also has fillers (blocks) 20 so arranged as to give confined channels of passage with safety valve means 29 for release of excessive gaseous pressure. Block 20 can be fabricated of any metal or organic solid material.

Container means 10 and temporary partition 11A define Region A in FIG. 2 in which viable organisms on tape 21 are introduced through an opening in container means 10 at latch 53 and hinge 54, thereafter closing container means 10 and again sealing off the unit. Container means 10, partition 11A and partition 12 define Region B in FIG. 2 having therein a medium containing a radioactively labeled nutrient in solution form. It is also possible to use a nutrient in solution form without having a radioactive label in the nutrient. Container means 10 and partition 12 define Region C having therein detection means 13 with wire means 14 exiting container means 10 at 43. The detection means 13 is capable of determining reactions by viable organisms and gives a signal output indicative of these reactions. Region C also has fillers (blocks) 20 so arranged as to give confined channels of passage with safety valve means 29 for release of excessive gaseous pressure.

In actual operation, the apparatus of FIGS. 1 and 2 are subjected to the sterilization process to be carried out over the given total volume or area, that is, the actual volume or area to be sterilized after viable organisms have been introduced in Region A of the apparatus. The apparatus are then withdrawn from the given, total volume or area when the sterilization process is completed and prior to the sealing of the given total volume or area. After the sterilization process is completed, partition 11 is eliminated in one of many possible ways so that the nutrient solution contained in Region B enters Region A. Any reactions caused by the life processes of viable organisms possibly present and surviving the sterilization process will generate gaseous media when these surviving organisms come in contact with the nutrient solution. The gaseous media will contain the radioactive factor of the nutrient solution when a radioactive factor is present in the nutrient solution. Otherwise the life process will be detectable by the composition of the gases given off when these gases are analyzed. Partition 12 is of such construction that it will enable gaseous media to pass through it, without allowing liquid media to pass through. This is in contrast with partitions 11 and 11A which are fabricated of a material restraining both liquids and gases. Since the labeled radioactive nutrient will be entering the life processes of the viable organisms, the radioisotope of the labeled nutrient will be present in one form or another in the gaseous media generated in the life processes and detectable by the detector 13. Detector 13 will generate impulses through wire means 14 thus stimulating certain readout devices (not shown) which keep record, actuate an alarm, etc.

In one embodiment, partition 11 will contain an empty cavity with a metal ball 17 which, when set in motion by electromagnetic means 15 with leads 16, would result in the elimination of partition 11, because when the ball 17 reaches a certain level of vibration, it will shatter the thin glass partition 11. A further embodiment of this partition 11A is shown in FIG. 2 wherein a membrane 11A, which will not pass a fluid, is placed under a slight tension load so that when the prong 18 held in positioning means 19 sealed within container means 10, is moved, partition 11A is eliminated by having the prong penetrate or puncture partition 11A. Thereafter, the nutrient solution in Region B enters Region A. In this embodiment, an elastomeric substance comprising partition 11A is desirable because when the puncturing occurs, the partition is completely eliminated.

Region B of FIGS. 1 and 2 has a charged nutrient (life process supporting) medium containing a radioisotopically labeled substrate which media is capable of entering compartment A as a fluid after partition 11 (or 11A) is removed. The labeled nutrient media, the bacterial gaseous matter of which is detectable by radioactive indicating means, is capable of supporting life processes of viable organisms in Region A which would happen to survive the sterilization process. A typical medium would be a liquid solution of mobile viscosity easily capable of flowing into Region A after partition 11 (or 11A) is removed. Typical solutions which could be formulated are as follows: A variety of bacteriological liquid growth media containing, for example, uniformly labeled $C^{14}$-glucose, $C^{14}$-acetate, $C^{14}$-propionic acid, $C^{14}$-glycine, alone or in combination, for bacteria having anaerobic or oxidative life processes. For the detection of anaerobic organisms, a medium could be formulated to contain either $C^{14}$ or $H^3$ in a substrate such that the gaseous metabolic product (methane, ammonia, etc.) would contain the radioactive label. A typical solution would have the above radioactive labels added to a Krebs or Ringers solution. These solutions are balanced salt solutions of proper osmotic pressure containing the following ions: $Na^+, K^+, Mg^{++}, Mn^{++}, SO_4^{--}, PO_4^{--}, Cl^-, NH_4^+$.

Partition 12 is designed so that it will restrain any liquid media in Region B, but will allow passage of gaseous media into Region C. From these requirements, it will be obvious that many different types of membrane materials will fulfill this function. Typical embodiments of this membrane are gas permeable glass or pyrex membranes.

The function of the apparatus 13 (radioactive detection means) in Region C is such that any radioactively labeled gaseous matter generated by a reaction of viable organisms with the nutrient solution of Region B is detected by the apparatus 13 after the gaseous matter enters Region C, and any number of appropriate readout or signal indicating means (not shown) can be connected with the detection means 13 in Region C. A particular embodiment of the detection means 13 would be having a small radioactive sensitive counter placed in conjunction with appropriate filling material 20 (fabricated of conventional materials such as steel) with the filling material 20 so arranged as to allow a small channel (FIG. 1) or small channels (FIG. 2) for gaseous flow into Region C. This enables a more concentrated flow of any reaction products, thus enabling better detection and a more reliable and rapid count by the radioactive detector 13. Safety valve means or outlet 29 represents a sealed opening acting as a pressure valve in case gas pressure builds up too high for the container means 10. Other detection means 13 could be utilized in Region C; an additional embodiment of the detection means 13 would be a small carbon dioxide analyzer capable of detecting minute concentrations of carbon dioxide in a gaseous body. For this embodiment, no radioactive label would be needed for the liquid media of Region B. This type of detection means 13 would be more likely to be incorporated with a permanent detection unit, as opposed to an expendable, inexpensive configuration. Such a more complex, expensive unit could furnish enough sensitivity in detection to enable a quantitative estimate of the efficiency of sterilization processes, plus being adaptable to follow a sterilization process as a function of time, thus furnishing a determination of the length of time for conducting such processes.

The signal out wire means 14 could be integrated with a number of readout apparatus. Examples of such apparatus are permanent recorders, alarm systems, an electrical light flashing only upon detecting viable organisms, etc.

From the above description, it is readily apparent that the apparatus of this invention are not limited in configuration and can be round, triangular, square, etc.; they are capable of being attached by a rubber seal, hooking means, etc., to the precise surface or volume being sterilized, either before or after the sterilization process. Further, each region of an apparatus is not limited in configuration or size.

From the above description, it is apparent that the method of the instant invention can be further perfected to meet various industrial and scientific requirements for checking sterilization processes. Certain known microorganisms are present in various industrial environments and can be selected and introduced into Region A depending upon the particular process being evaluated. One particular technique is to place the viable organisms on tapes 21 which are in turn affixed to the inside of container means 10 in Region A. If these microorganisms survive the sterilization process, one will be advised that the sterilization process was ineffective or must be repeated for a greater length of time or more thorough sterilization processes employed. The tapes employed could vary all the way through double backed tape or very light weight, thin strips currently available on the market.

Figure 3:
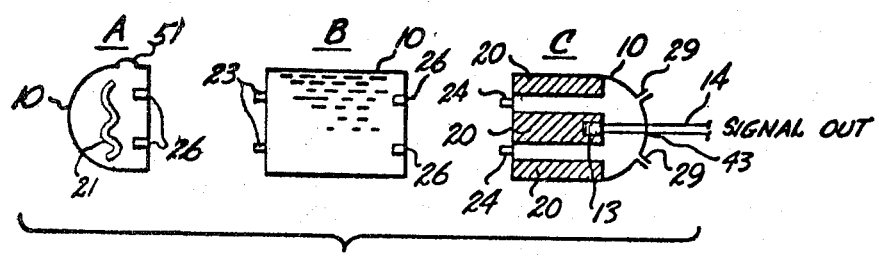
FIGS. 3 and 4 show the arrangements of apparatus capable of carrying out the sequence of the flow diagram.
Figure 4:
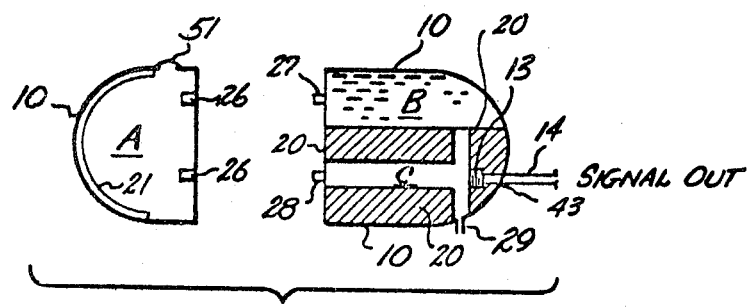

The apparatus depicted in FIGS. 3 and 4 are variations of the apparatus described above, varying only in that each region is a distinct unit. In particular, unit A as set forth in FIGS. 3 and 4 would consist of a container means 10 of various possible configurations with two self-sealing openings 26 therein and sealed opening 51 which is sealed after introduction of tape 21. The container means 10 could be fabricated of various materials such as plastic, sheet steel, sheet metal, stamped foil and various synthetic organic materials. Various types of membrane coverings or self-sealing openings could be employed for openings 26. Container means 10 of unit A has an opening 51 enabling insertion of tape 21 after which opening 51 is sealed off.

Unit B in FIG. 3 is a container means 10 capable of holding a fluid body, with self-sealing outlets 23 so adapted that when the prongs 23 of unit B are fitted with openings 26 of unit A, the fluid body of unit B held in container means 10 is emptied into container means 10 of unit A. The fluid body is a radioactively labeled Krebs or Ringers solution as set forth above.

For unit C in FIG. 3, the container means 10 is fabricated of conventional materials. The filling or block material 20 consists of such conventional materials as lead, steel, wood, etc. The inlets 24 of unit C are adapted so that when they are fitted within receptacles 26 of either unit A or unit B when unit B is connected with unit A, they will allow passage of gas into unit C without letting in any fluid. Again the conventional permeable glass materials discussed above could be employed within inlets 24 and 28. Outlets 29 in unit C are so designed as to enable the emission of gas when a certain pressure is reached in unit C, thus serving as a safety valve. This will insure against failure of the unit plus enabling a continuous detection over a great length of time. Detection means 13 with leads 14 exiting unit C through container means 10 at point 43 could be either a radioactive detector or a gas analyzer.

In FIG. 3, unit B with container means 10 comparable in construction to unit A is isolated and adapted with certain spouts 23 so as to enable it to inject into the unit A the nutrient solutions described above, which would be capable of supporting life functions of any surviving viable organisms in unit A. It is felt that unit B could be an isolated unit, such as a large tank, consisting of a solution capable of supporting life processes of viable organisms or a reservoir of the same solution with a hose and injection spout on the end of the hose. This would enable, at the time of introduction of the fluid, maintenance of optimum temperature, concentration, and other variables desirable for testing and life supporting conditions.

Still further utilization of the instant invention can be realized by reference to FIG. 3. In the utilization of the instant invention of checking the efficiency of a sterilization process being conducted upon a given volume as set forth in FIG. 3, this invention consists of the practice of a series of steps comprising: First, defining a known, sealed region A within said volume which sealed region A is of one unit having therein known viable organisms; second, subjecting said sealed region A to the sterilization process to be carried out over the whole volume; third, connecting said sealed region A to a second unit B having therein a life supporting fluid, thus introducing said fluid into said sealed region A; fourth, connecting said sealed region A to a third unit C having therein detection means for determining the presence of gaseous matter resulting from the life processes of viable organisms. It is also possible to leave unit B connected to unit A while connecting unit C to unit B, the result being that all three units are connected during the final detecting step. It is also possible to have a second unit B and C having therein a life process supporting fluid and a detection means being distinctly separated from each other thus enabling the simultaneous performing of the introduction of the life supporting fluid and the detection of gaseous material.

A further embodiment of the instant invention is shown in FIG. 4 wherein this method of performing the invention consists of a series of steps comprising: First, exposure of unit A to a sterilization process; second, simultaneously connecting units B and C to unit A, thus introducing the nutrient solution of unit B into unit A and detecting any gaseous matter of any life processes in unit A.

This method of utilizing the instant invention whereby unit A, which consists of a container means 10 with various samples of bacteria 21 being taped therein, can be used in the process of sterilization as conducted on the product in the plant and later taken to the laboratory for testing. The above description of taping various species of bacteria and other organisms within container A with or without food could be utilized here. The container means 10 would be the same as above: lightweight plastic, thin metal, metal sheet or synthetic organic materials.

The configuration and size of unit A could be adapted to the requirements of the particular system being tested. By isolating unit A, which consists of container means 10 with openings 26 and 51 with opening 51 being subsequently sealed after introduction of tape 21, it is possible for the manufacturer or processor, depending upon the sterilization process involved, to employ unit A and then send it back to his source for testing to determine the effectiveness of his sterilization process. Thus, it is seen where a manufacturer or processor, by utilization of this invention, would be using a system similar to the radiation detectors now worn by personnel in radiation work. This would be of particular importance to the small processor or cannery which would not want the added burden of testing.

When unit B and C are permanently connected as shown in FIG. 4, unit B and unit C would have prongs so as to enable both the simultaneous injection of the life supporting nutrient solution into unit A from unit B and the emission of gases from unit A to unit C, with unit C having therein the appropriate detection means. Inlet spout 28 (connection means) of unit C is so adapted to allow transmission of gases but not liquids. Unit C in these last instances, as shown in FIGS. 3 and 4, would contain detection means mounted in permanent position which could test the gaseous emissions from unit A when it is connected therewith. It is felt that unit C could be a portable unit, which would enable personnel to carry unit C and connect it to a whole series of containers comparable to unit A, testing each container in turn. Ejection spout 27 (connection means) of unit B is so adapted to allow discharge of the fluid in unit B when unit B is connected to unit A.

The sequence of steps of using the instant invention is capable of being adapted to a commercial process whereby the people employing the services of this process secure from a central vendor a supply of sealed containers comparable to unit A. The user or customer dictates the size and shape of unit A. Unit A would be utilized by the customer in testing his various sterilization processes; in other words, unit A would be exposed to a particular sterilization process to be carried out on the item being tested by the user. After utilization of unit A, the customer then returns unit A to the vendor for the subsequent series of steps to be performed to determine the efficiency of the user's sterilization processes. Unit A is directly returned without exposure to any severe conditions in transit. Upon receipt, the vendor then carries out the testing of unit A to determine if there are any viable organisms capable of carrying on life processes. The first step again is the injection of a nutrient solution into unit A with allowance of elapse of time so as to enable the organisms to utilize the nutrient solution with a following detection step. Then unit C is connected to unit A and detection of possible life processes is undertaken.

Figure 5:
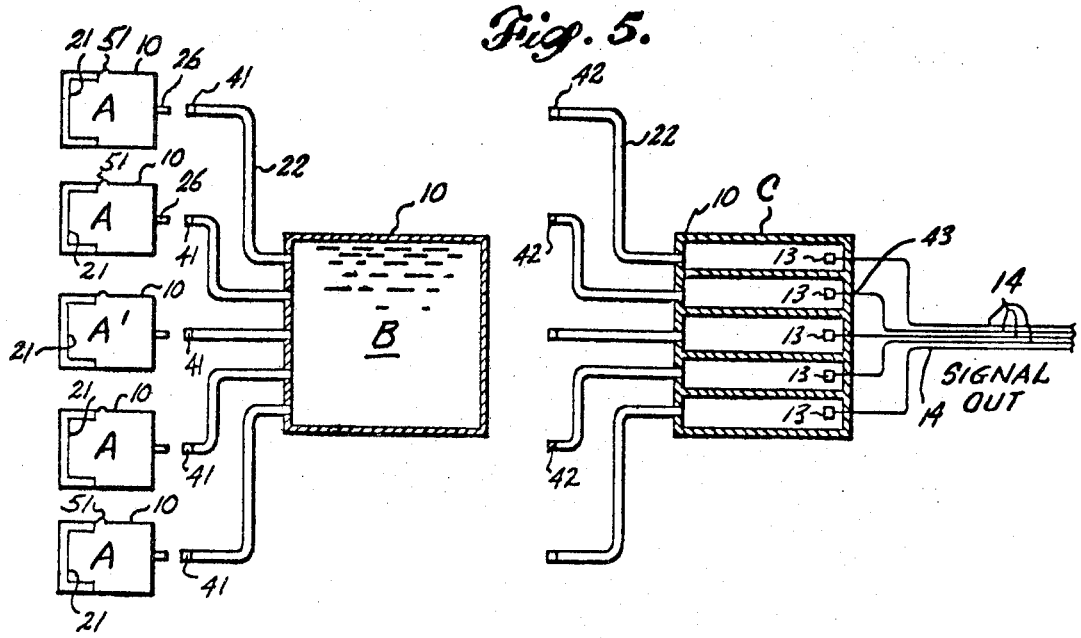
FIG. 5 shows another method and apparatus of the instant invention utilizing a control (blank) region.

When a large volume undergoes sterilization, several units comparable to unit A having container means 10 with a self-sealing connection means 26 and an opening 51 being sealed off after introduction of tape 21, can be employed to determine the efficiency of the sterilization process at various points throughout the total volume as shown in FIG. 5. It is also possible to have one unit A' of container means 10 with a self-sealing connection means 26 and an opening 51 being sealed off without the introduction of tape 21. After testing, one introduces a radioactively labeled solution contained in unit B as shown in FIG. 5. Unit B consists of container means 10 with hoses 22 having an injection tip 41 adaptable to fit inlet 26 of each of the units A. When connected, unit B injects the nutrient solution into unit A as defined by container means 10. Thereafter a segment of unit C is connected by hoses 22 with coupling means 42 by fitting into inlet 26 of unit A. Thus, detection of viable organisms in each unit A is achieved by a separate detection means 13, each detection means 13 having a separate readout wire 14 exiting unit C at 43.

Figure 6:
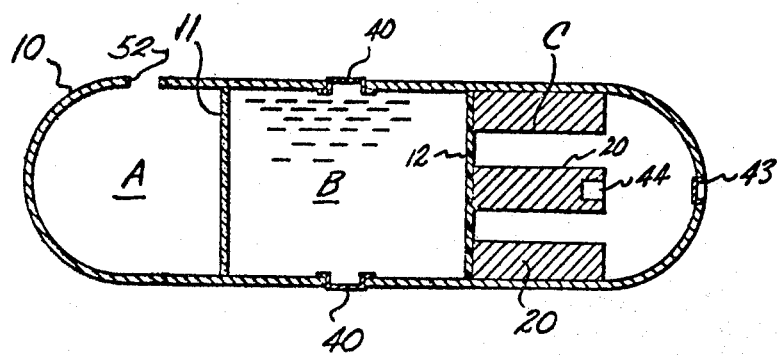
FIG. 6 is an article of manufacture capable of being adapted to practice the instant invention.

FIG. 6 shows an article of manufacture adaptable to the practice of the instant invention consisting of container means 10 and temporary partition 11 and permanent partition 12 with a nutrient solution positioned between partitions 11 and 12. Seals 40 in container means 10 can be penetrated by a prong which can be used to break partition 11. Blocks 20 are arranged so as to channel any gaseous matter passing gas permeable but liquid confining partition 12. Seal 43 can be broken for insertion of a radioactive detection unit or gas sampling unit which will rest in slot 44. Opening 52 enables insertion of bacteria containing tapes and then opening 52 is subsequently sealed off.

The many advantages in utilization of the instant invention of a method and apparatus for detecting viable organisms will be readily apparent to those skilled in the art. The typical uses of this invention and apparatus would include checking upon the sterilization processes normally conducted in the food industry, the chemical industry, the drug industry and space hardware. Thus, the instant invention insures reliable and uniform determination of the fact that various processes and materials are free of any viable organisms and/or harmful bacteria. Thus, it is seen that the instant method and apparatus can be advantageously employed to check products to determine the effectiveness of the sterilization processes essential to a quality final product without ever having violated the sterilized end product. Further, certain types of space payloads, when first being introduced into new regions of outer space, are normally sterilized so as to prevent introduction of earth organisms into any regions of outer space. The instant method and apparatus can be readily used to detect the effectiveness of the sterilization process on any area or region of a given space payload. Other inherent advantages and features of the instant method and apparatus include the adaptability of the configuration of the apparatus shown in FIGS. 1, 2 and 6 so as to enable it to be employed in almost any conceivable situation. If certain processes or products require odd shapes so as to enable the unit to be incorporated within certain limited areas, apparatus as depicted in this invention could be readily shaped so as to conform to the requirements. It is also envisioned that the apparatus could be of variable size so as to enable detection of viable organisms over very large areas, or over very small areas, including small areas approaching semi-miniaturized conditions. The rapidity with which a determination is made, either qualitative or quantitative, should also be emphasized. It is felt that an accurate check upon a sterilization process could be obtained in short periods of time after introduction of the nutrient solution into the place where the bacteria were positioned. A summary of other advantages of the instant method and apparatus are as follows: (1) very inexpensive initial fabrication and construction costs, (2) capable of use by normal manufacturing personnel, (3) very reliable qualitative detection, (4) adaptable to being used in an expendable manner, and (5) adaptation of the final readout, thus enabling permanent records, alarms and similar utilization of the output information to be incorporated into any manufacturing system.

While we have described and illustrated some preferred forms of our invention, it should be understood that many modifications may be made without departing from the spirit and scope of the invention, and it should therefore be understood that the invention is limited only by the scope of the appended claims.

We claim:

1. An apparatus for determining the efficacy of a sterilization process comprising:
   a. means defining a first chamber for containing viable organisms that are subjected to the sterilization process;
   b. means defining a second chamber for containing a liquid nutrient media capable of supporting the life processes of the viable organisms, said second chamber being separated from said first chamber by an openable partition;
   c. means defining a third chamber for detecting the gaseous products of the life processes of the organisms, said third chamber being separated from the second chamber by a partition permeable to the gaseous products of the life processes of the organisms and impermeable to the liquid nutrient media;
   d. opening means for opening the partition between the first and second chambers after completion of the sterilization process to permit the nutrient media to contact the organisms; and
   e. detection means operatively associated with the third chamber for detecting the products of the life processes of the viable organisms surviving the sterilization process.

2. The apparatus as claimed in claim 1 wherein said openable partition encloses a movable object and said opening means comprises an electromagnetic means for actuating the movable object to break open the partition separating the first and second chambers.

3. The apparatus as claimed in claim 1 wherein said three chambers are connectable to and disconnectable from each other by means of self-sealing outlets and prongs.

4. The apparatus as claimed in claim 1 wherein said first chamber is connectable to and disconnectable from said second and third chambers by means of self-sealing outlets and prongs.

5. The apparatus as claimed in claim 1 wherein the nutrient media contains a radioactive isotope which is carried by the products of the life processes of the organisms and the detection means is a radiation detector.

6. The apparatus as claimed in claim 1 wherein the products of the life processes of the viable organisms surviving the sterilization process are gaseous, and the detection means is a gas analyzer.

7. An apparatus for determining the efficacy of a sterilization process comprising:
   a. means defining a plurality of first chambers for containing viable organisms that are subjected to the sterilization process, each of said chambers having self-sealing connector means;
   b. means defining a second chamber for containing a nutrient media capable of supporting the life processes of the viable organisms;
   c. means defining a plurality of third chambers for detecting the products of the life processes of the organisms;
   d. first series of conduit means communicating with said second chamber and connectable to each of the self-sealing connector means for transferring the nutrient media from said second chamber to said plurality of first chambers after completion of the sterilization process;
   e. second series of conduit means communicating with each of said plurality of third chambers and connectable to each of the self-sealing connector means for transferring the products of the life processes of the viable organisms that survive the sterilization process from each of the first chambers to each of the third chambers respectively; and
   f. detection means operatively associated with each of said third chambers for detecting the products of the life processes of the viable organisms surviving the sterilization process.

8. The apparatus as claimed in claim 7 wherein the nutrient media contains a radioactive isotope which is carried by the products of the life processes of the organisms and the detection means is a radiation detector.

9. The apparatus as claimed in claim 7 wherein the products of the life processes of the viable organisms surviving the sterilization process are gaseous, and the detection means is a gas analyzer.

* * * * *